(12) United States Patent
Renz et al.

(10) Patent No.: US 7,201,385 B2
(45) Date of Patent: Apr. 10, 2007

(54) MULTI-PURPOSE CART ASSEMBLY

(75) Inventors: Susan M. Renz, West Chester, PA (US); Catherine M. Stevenson, West Chester, PA (US); Sabine Platten, Malvern, PA (US); Frank V. Linker, Jr., Broomall, PA (US); Devendra Win Shendge, Birdsboro, PA (US)

(73) Assignee: SRP Enterprises, Inc., West Chester, PA (US)

( * ) Notice: Subject to any disclaimer, the term of this patent is extended or adjusted under 35 U.S.C. 154(b) by 0 days.

(21) Appl. No.: 11/288,541

(22) Filed: Nov. 29, 2005

(65) Prior Publication Data

US 2006/0163828 A1 Jul. 27, 2006

Related U.S. Application Data

(60) Provisional application No. 60/631,802, filed on Nov. 30, 2004.

(51) Int. Cl.
B62B 1/04 (2006.01)

(52) U.S. Cl. .................. 280/79.11; 280/647; 280/655; 280/657; 280/47.34; 280/47.371

(58) Field of Classification Search ............. 280/79.11, 280/827, 828, 7.1, 7.15, 647, 648, 650, 651, 280/655, 656, 657, 658, 87.01, 87.021, 87.05, 280/47.18, 47.25, 47.38, 47.4, 47.34, 47.35, 280/47.371
See application file for complete search history.

(56) References Cited

U.S. PATENT DOCUMENTS

| | | | |
|---|---|---|---|
| 1,025,292 A | 8/1912 | Nilsson | |
| 2,469,242 A | 5/1949 | Pohl | |
| 3,488,062 A * | 1/1970 | Walda | 280/43 |
| 3,664,465 A | 5/1972 | Holland | |
| 4,647,056 A * | 3/1987 | Baker | 280/37 |
| 4,887,836 A | 12/1989 | Simjian | |
| 5,403,023 A | 4/1995 | Tsai | |
| 5,772,222 A | 6/1998 | Sim | |
| 5,911,424 A * | 6/1999 | Rovinsky | 280/79.11 |
| 6,102,433 A | 8/2000 | Stevens | |
| 6,581,945 B1 * | 6/2003 | Shapiro | 280/30 |
| 6,733,026 B1 | 5/2004 | Robberson | |
| 6,877,764 B2 * | 4/2005 | Sagol | 280/655.1 |
| 6,916,028 B2 * | 7/2005 | Shapiro | 280/47.34 |
| 6,929,270 B1 * | 8/2005 | Flagstad et al. | 280/79.11 |
| 2004/0232660 A1 | 11/2004 | Chen | |
| 2004/0245733 A1 | 12/2004 | Abel | |
| 2005/0212242 A1 * | 9/2005 | Cheng | 280/79.11 |

FOREIGN PATENT DOCUMENTS

JP 2002-316647 10/2002

* cited by examiner

*Primary Examiner*—J. Allen Shriver
(74) *Attorney, Agent, or Firm*—Eugene E. Renz, Jr.

(57) ABSTRACT

A cart assembly comprising a housing and a wheel assembly mounted in the housing, releasable locking means for selectively positioning said wheel assembly between operative and stored limit positions, a handle assembly and means for selectively positioning the handle between an outer operative limit position and an inner stored limit position inside the housing.

8 Claims, 15 Drawing Sheets

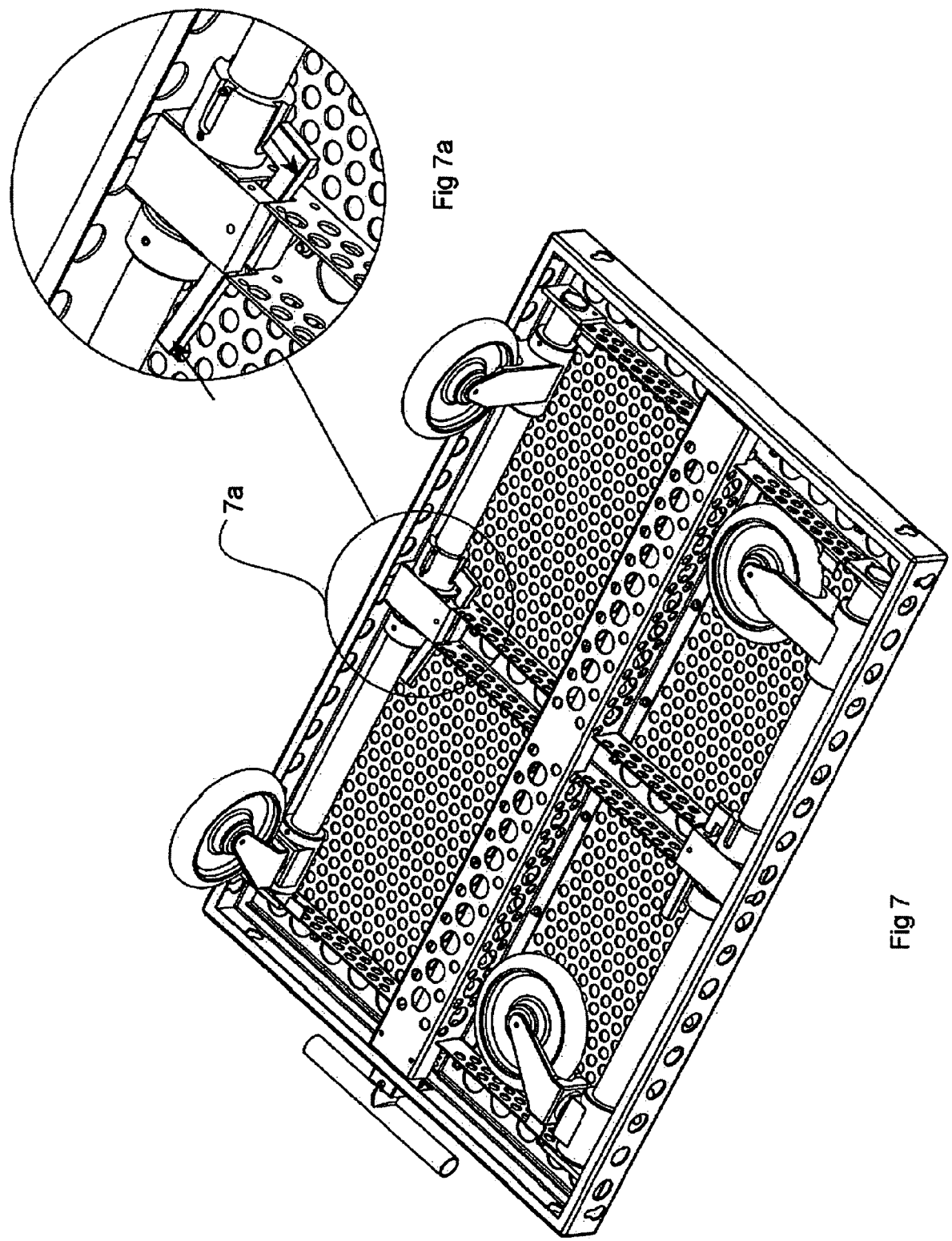

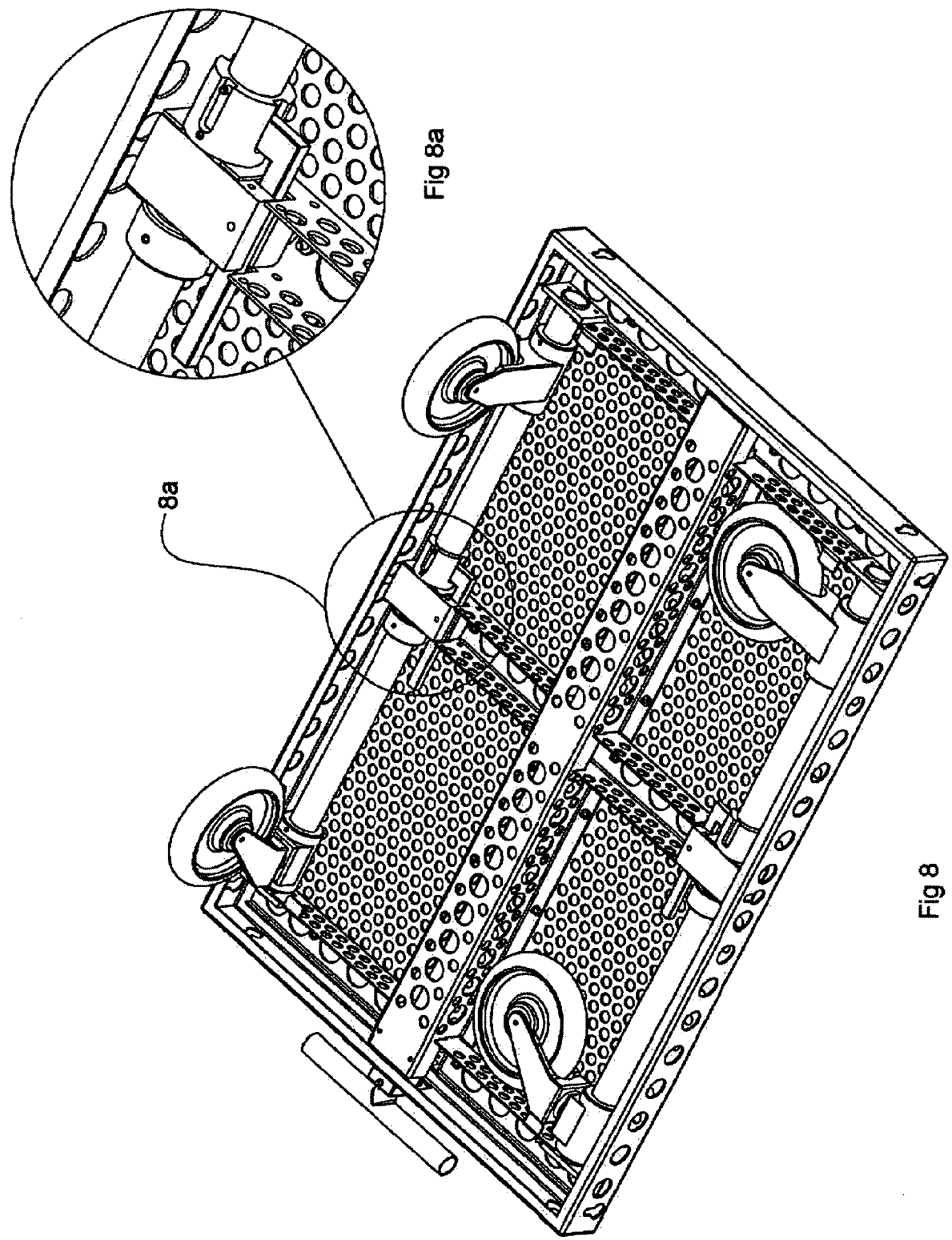

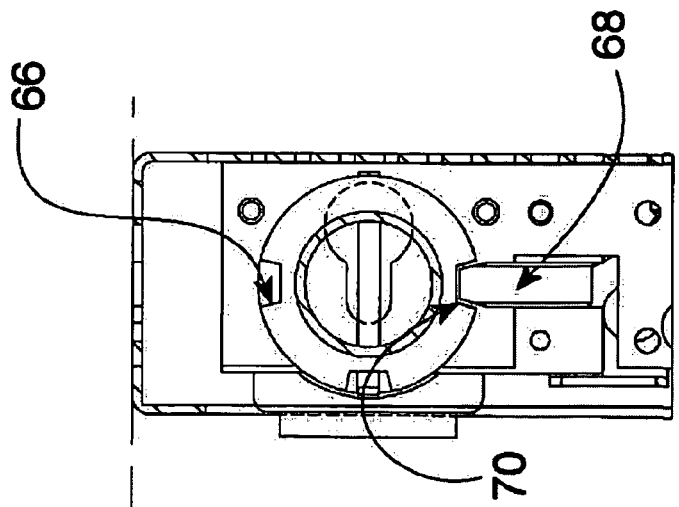
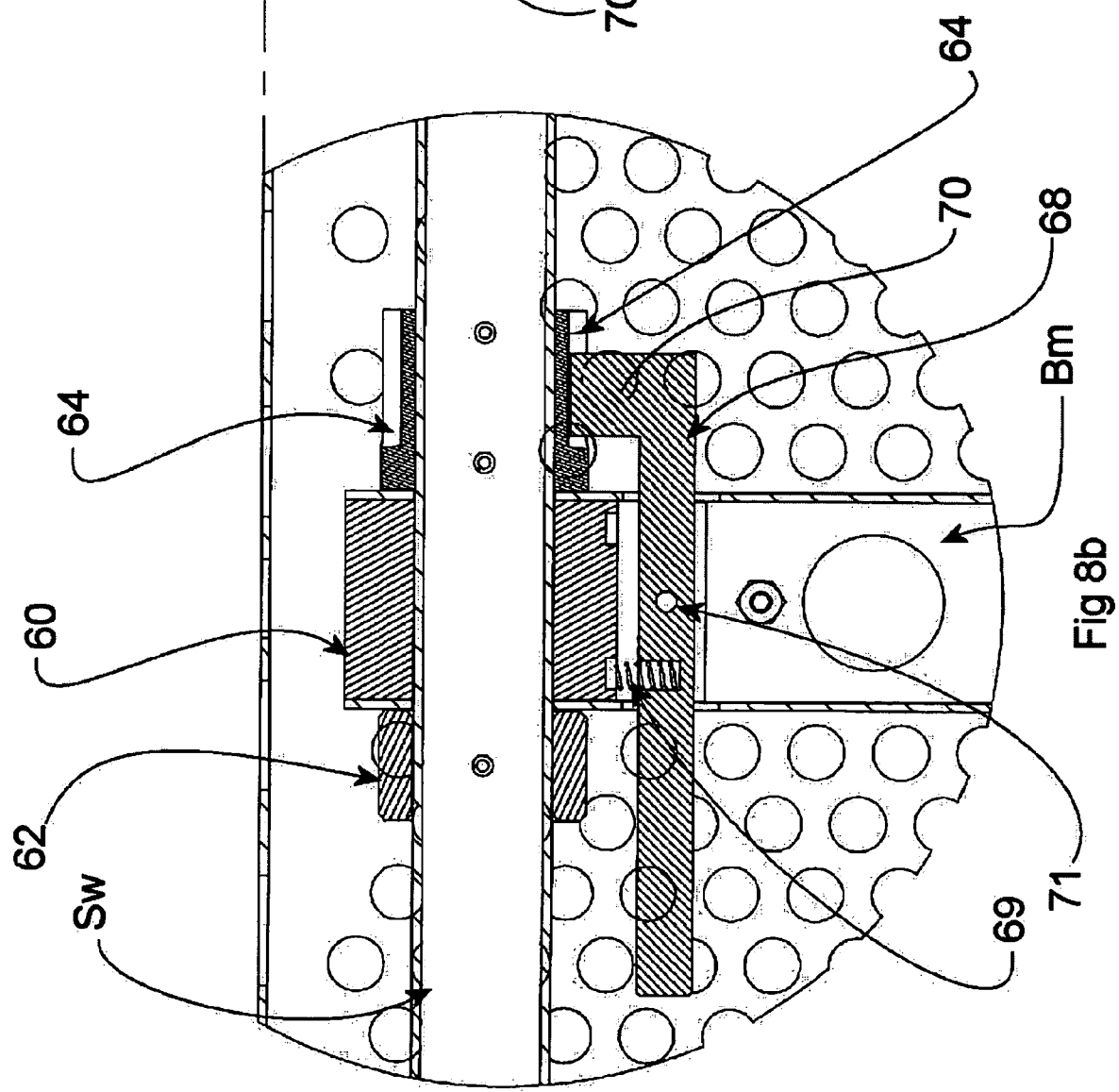
Fig 8c
Fig 8b

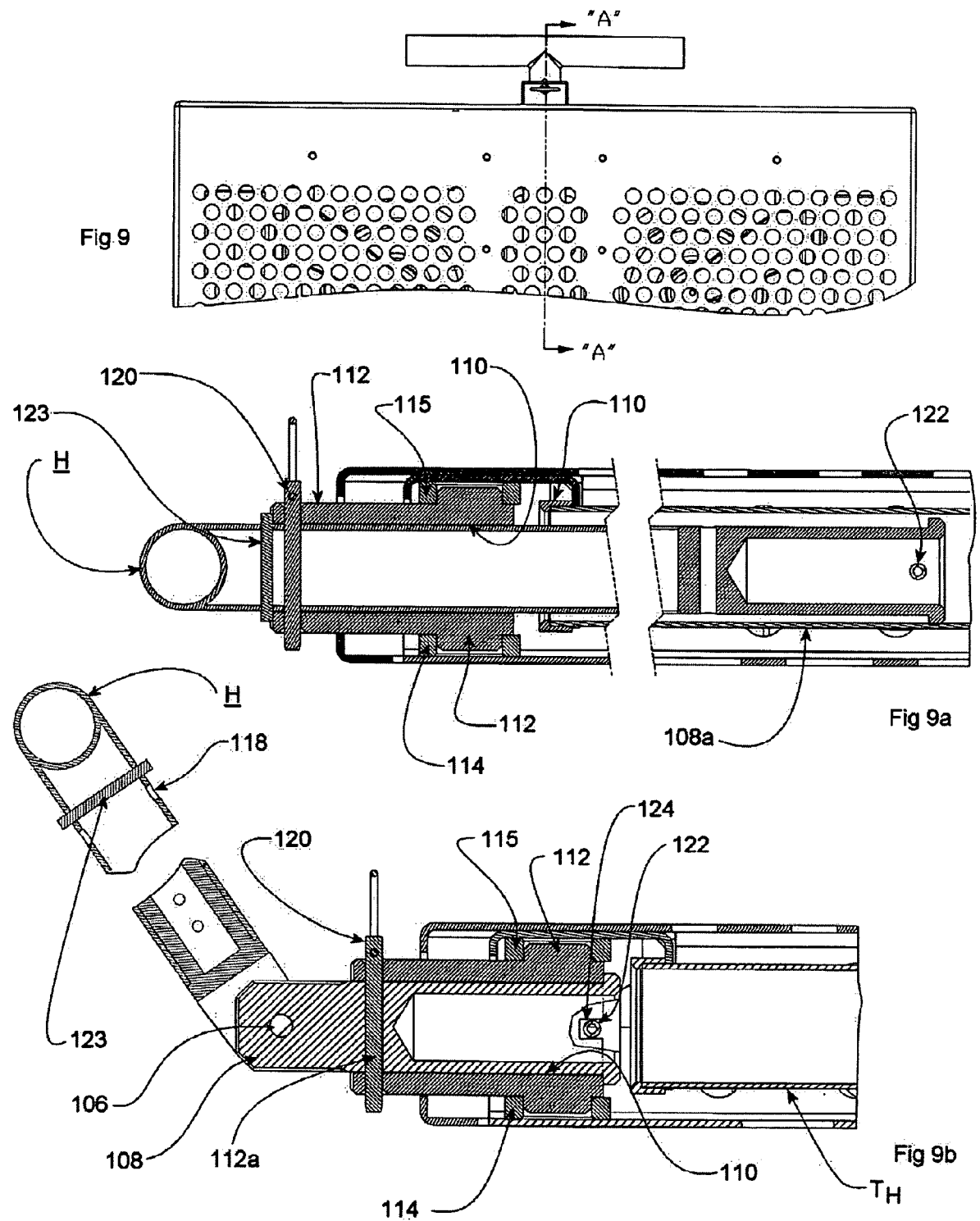

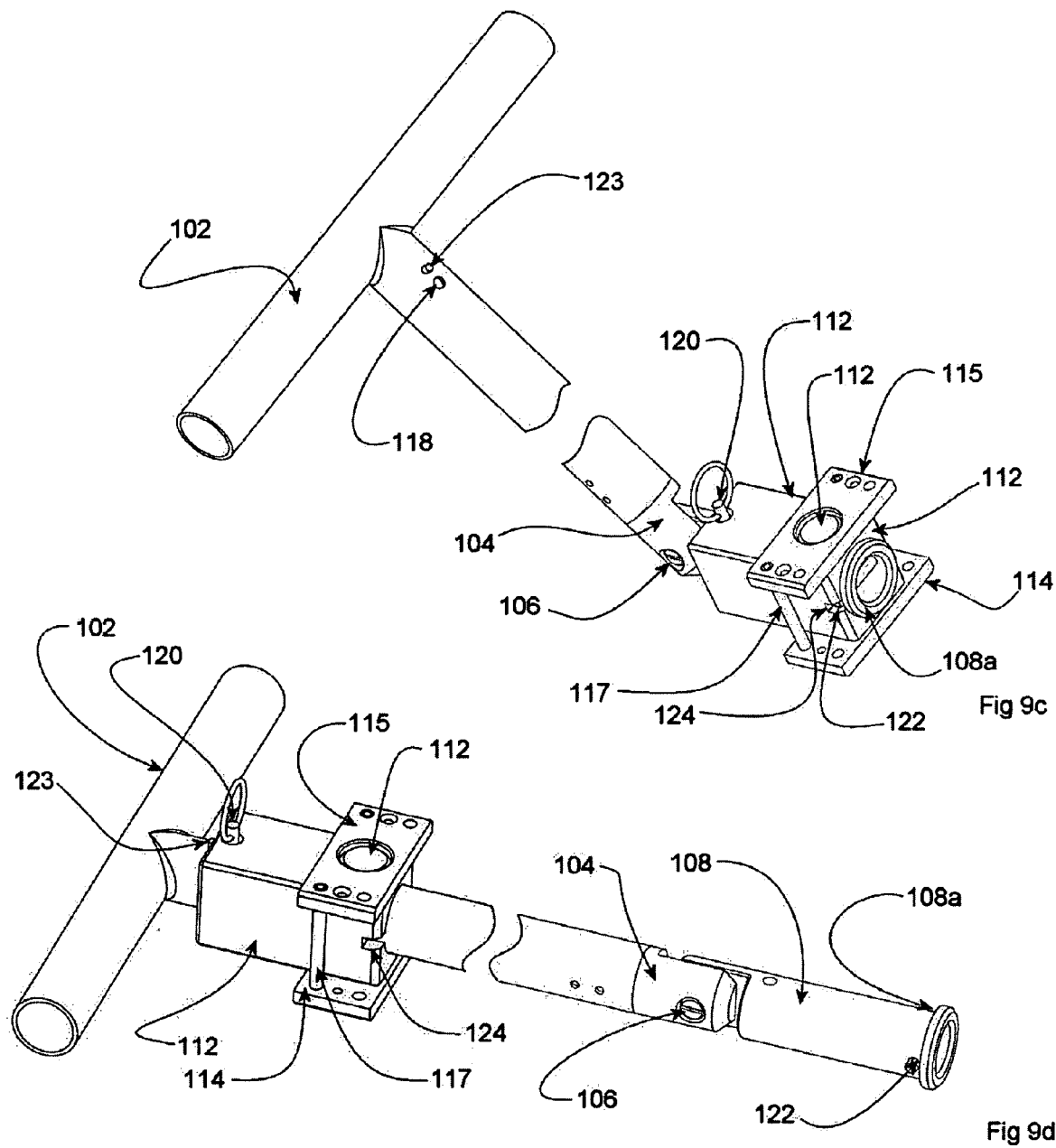

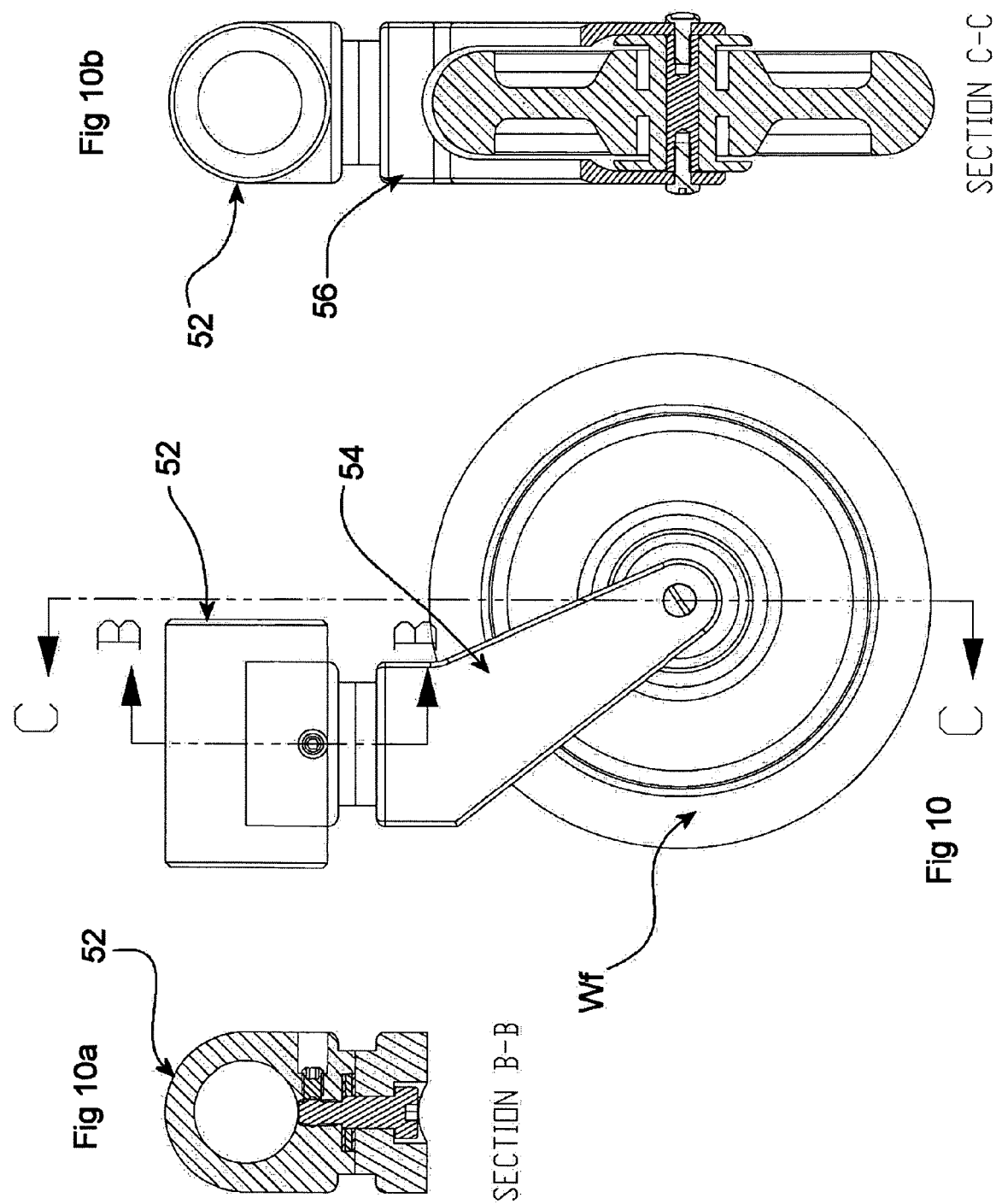

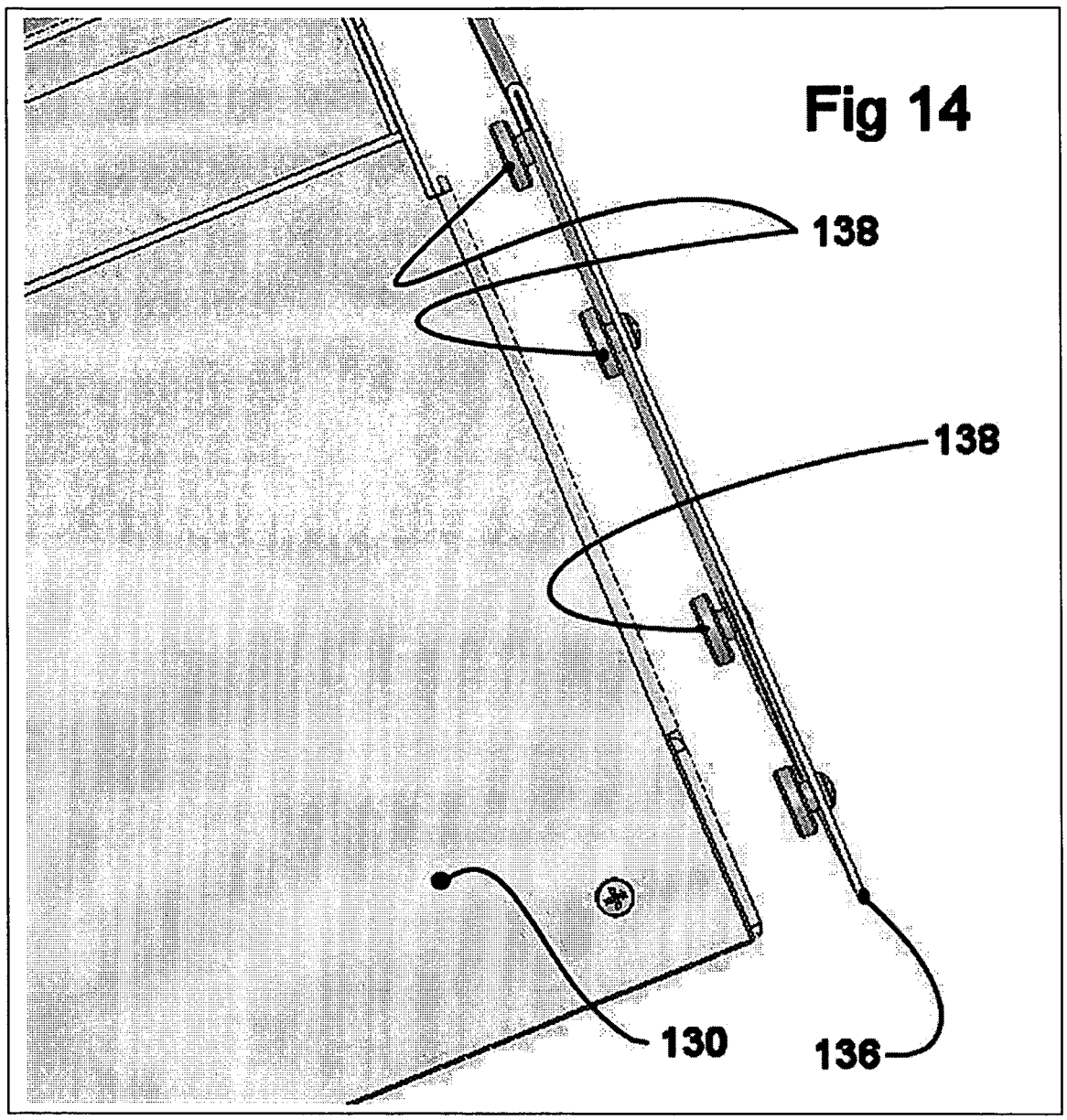

MULTI-PURPOSE CART ASSEMBLY

This application claims the benefit of U.S. Provisional Application Ser. No. 60/631,802 filed Nov. 30, 2004.

FIELD OF THE INVENTION

The present invention relates to improvements in cart assemblies characterized by novel features of construction and arrangement providing a cart which has collapsible and retractable features so that it can be easily positioned between operative and storage positions which is lightweight and has a bracing structure so that the cart can accommodate relatively heavy payloads.

BACKGROUND OF THE INVENTION

Carts are not new per se and are used for a variety of functions. For example, grocery carts and carts for handling luggage in airports are well known. Some of these carts have collapsible features even though they tend to be bulky and are often difficult to store in a relatively small space when not in use. Some of these carts are somewhat fragile and have a relatively small load-carrying capacity.

SUMMARY OF THE INVENTION

The features of the cart of the present invention make it eminently suited for use by shoppers frequenting large retail stores like Home Depot and Lowes. The compact and lightweight design makes it easy to store in a small space in the trunk of a car or in the rear compartment of an SUV. The handle can be released and locked in an operative position and the wheel assemblies pivot and lock in the use position easily and quickly at the parking lot. The items to be purchased can be easily loaded and secured on the cart. After checking out and loading, the items purchased in the car or SUV, the cart can again be easily and quickly stored for the next use by retracting the wheels and retracting the handle.

The cart is adapted for use by persons who show or train dogs. It has been found that space in vehicles such as SUV's, vans and trucks is at a premium because of the equipment needed at the show or training site, i.e. coolers, grooming equipment and other items. The cart of the present invention takes up little space in the vehicle and can be readily erected and loaded to transport what is needed from the parking area to the show or training site in one trip.

BRIEF DESCRIPTION OF THE DRAWINGS

These and other objects of the present invention and the various features and details of the operation and construction thereof are hereinafter more fully set forth with reference to the accompanying drawings, wherein:

FIG. 2a is an enlarged fragmentary view of the portion of the handle circled in FIG. 2.

FIG. 3a is an enlarged fragmentary view of the portion circled in FIG. 3 labeled 3a showing a tab preventing pivoting of the swivel wheels when the wheels are retracted and nested in the top support cover;

FIG. 3b is an enlarged fragmentary view of the portion circled in FIG. 3 labeled 3b showing the mechanism for locking the wheel assemblies in the retracted and operative positions;

FIGS. 7 and 7a are views similar to FIGS. 6 and 6a respectively with one wheel assembly fully pivoted to an operative position wherein the lever is positioned to engage in a slot on a collar mounted on the wheel shaft to lock the wheel in this position;

FIGS. 8 and 8a show the spring biased locking lever automatically seating in the groove to lock the wheel assembly in the raised, operative position;

FIG. 8b is an enlarged fragmentary sectional view of the portion circled in FIG. 8 showing the lever seated in a groove in a locking collar mounted on the wheel shaft;

FIG. 8c is a sectional view showing the complementary tapers on the lever and locking grooves to provide a rigid support when the wheels are at either limit position;

FIG. 9 is a fragmentary top plan view of the handle end of the cart;

FIG. 9a is an enlarged sectional view taken on lines A—A of FIG. 9 showing the pin for locking the handle in an outer operative position and also showing the handle orientation pin engaged in a cut out in the handle pivot trunnion which aligns the handle angularly so that the locking pin can be inserted to lock the handle in the operative position;

FIG. 9b is a sectional view similar to FIG. 9a with the handle in the operative outer position;

FIG. 9c is an enlarged fragmentary perspective view showing details of the swivel wheel mount and the handle orientation pin with the handle in the operative outer position;

FIG. 9d is a perspective view showing the handle in a stored position;

FIG. 10 is a side elevational view of the swivel wheel;

FIGS. 10a and 10b are sectional views taken on lines B—B and C—C of FIG. 10;

FIGS. 13 and 14 are fragmentary perspective views showing the bayonet slots and buttons engaging in the slots to secure the panels at the corner locations.

DESCRIPTION OF THE PREFERRED EMBODIMENTS

Figure 1:
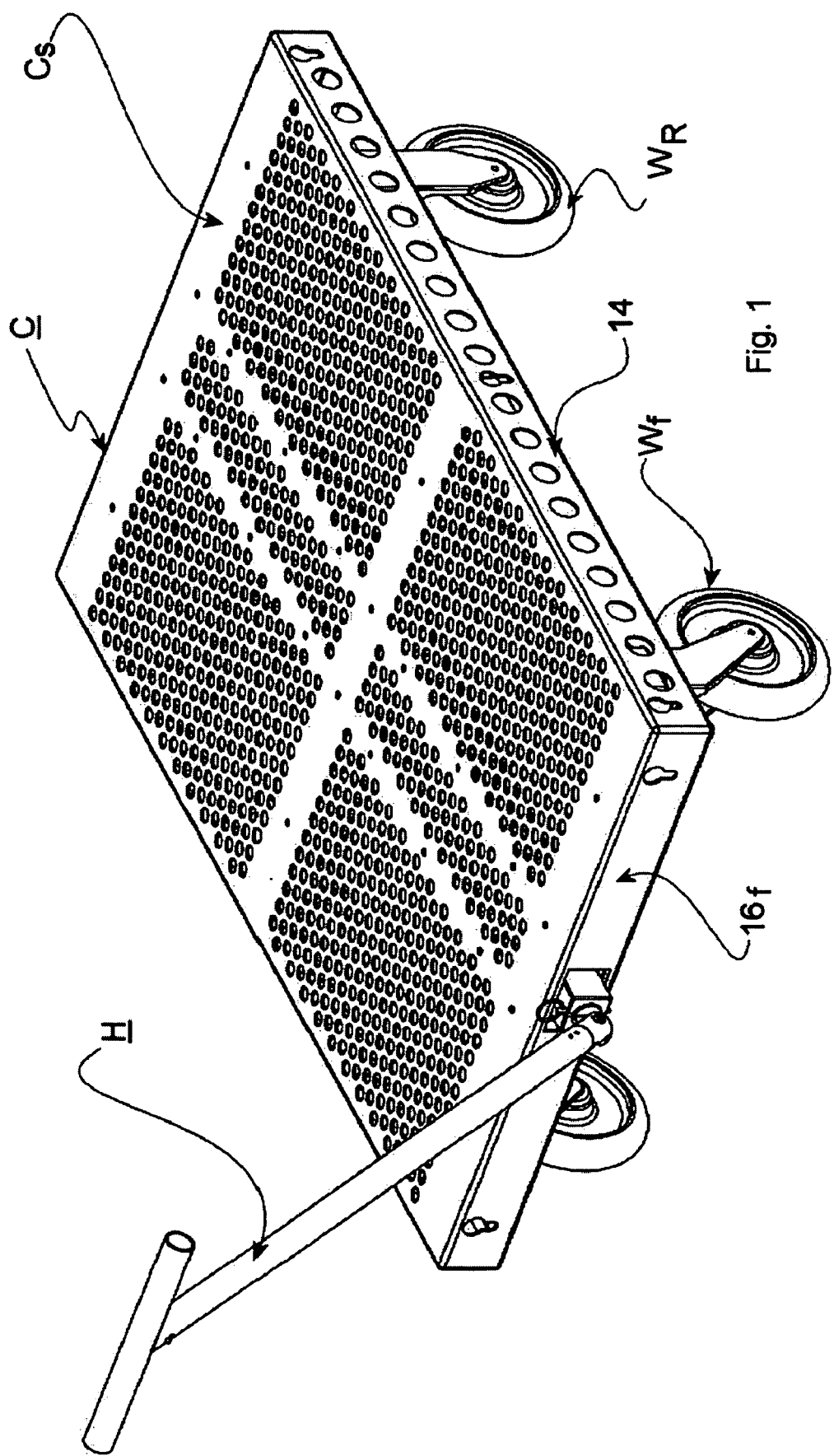
FIG. 1 is a perspective view of a cart assembly in accordance with the present invention in its operative position.
Figure 2:
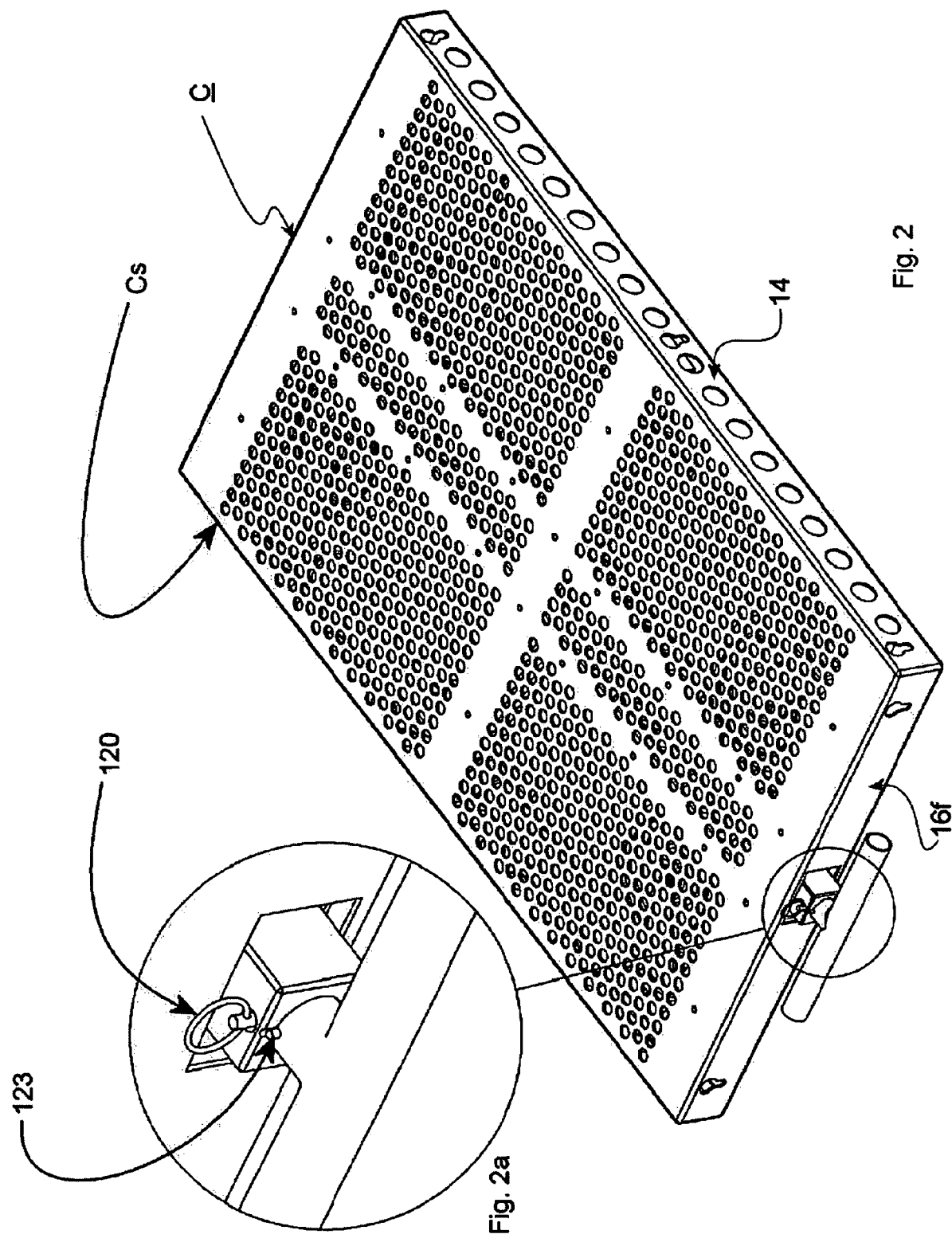
FIG. 2 is a perspective of the cart showing the wheels and handle retracted to facilitate storage of the cart assembly in a relatively small space.
Figure 3:
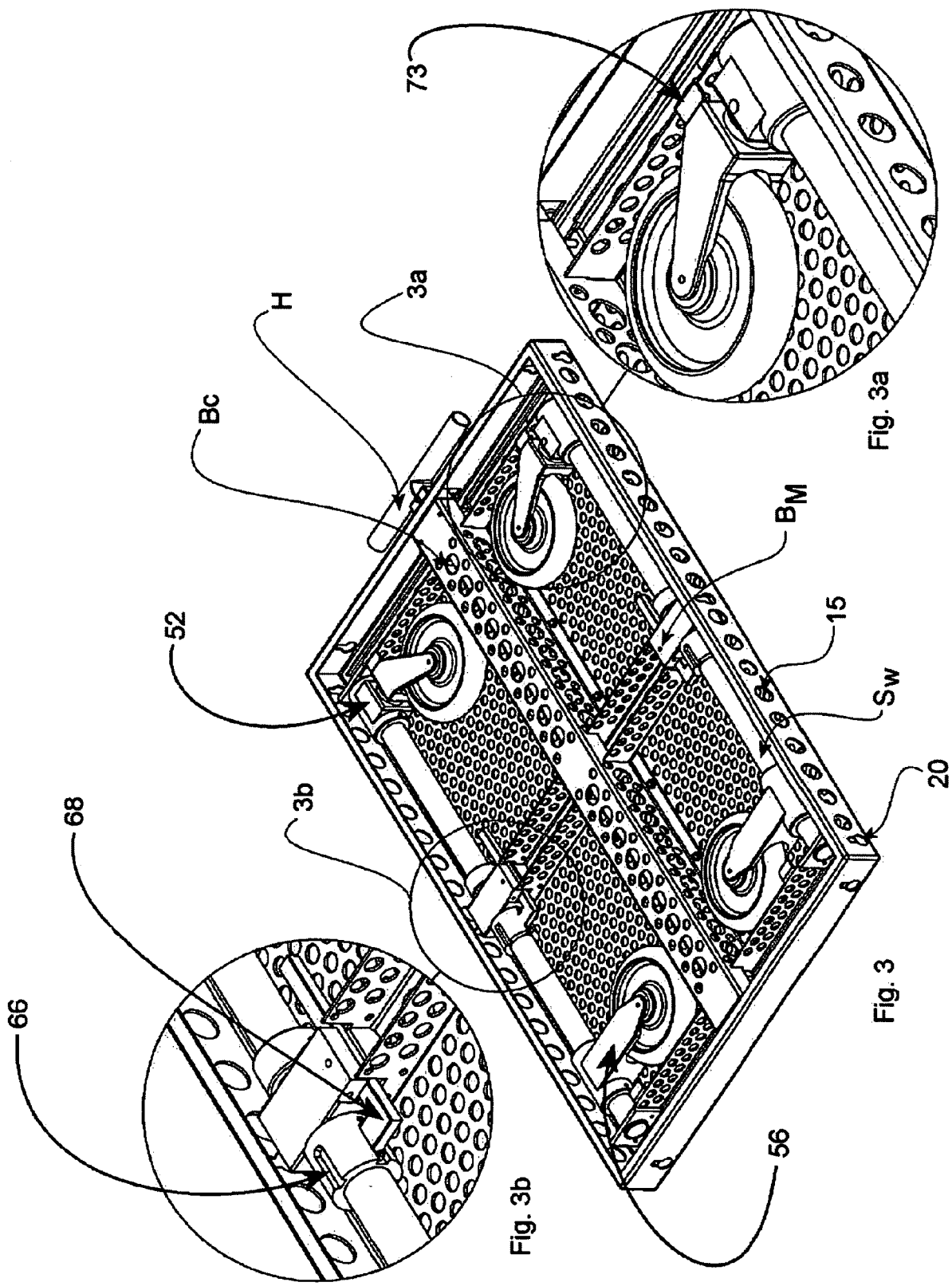
FIG. 3 is a perspective view showing the cart in the retracted storage position as viewed from the underside.

Referring now to the drawings and particularly to FIGS. 1–5a thereof, there is shown a multipurpose cart assembly in accordance with the present invention broadly designated by the letter C.

Considering first broadly the basic components of the Cart C and how they function, the cart comprises a top support cover $C_s$ of generally rectangular shape having laterally extending cross braces $B_e$ at the front and rear ends of the top support cover $C_s$ and a middle cross brace $B_m$ generally parallel to the end braces $B_e$. A center brace $B_c$ of inverted U-shaped cross section extends longitudinally from the front to the rear end of the cart generally transversely to the cross braces $B_e$, $B_m$. The particular shape and configuration of the various braces provides a relatively rigid construction so that the cart can support a payload of considerable weight. The top support $C_s$ and braces are preferably made of a thin gage aluminum which can easily be stamped to the desired shapes shown and which have a pattern of screen mesh holes to provide a relatively light weight easily portable cart assembly. Enlarged openings O are provided in the side walls of the top support cover $C_s$ so that objects can be secured to the cart by bungee cords anchored in the enlarged side wall openings O.

Figure 4:
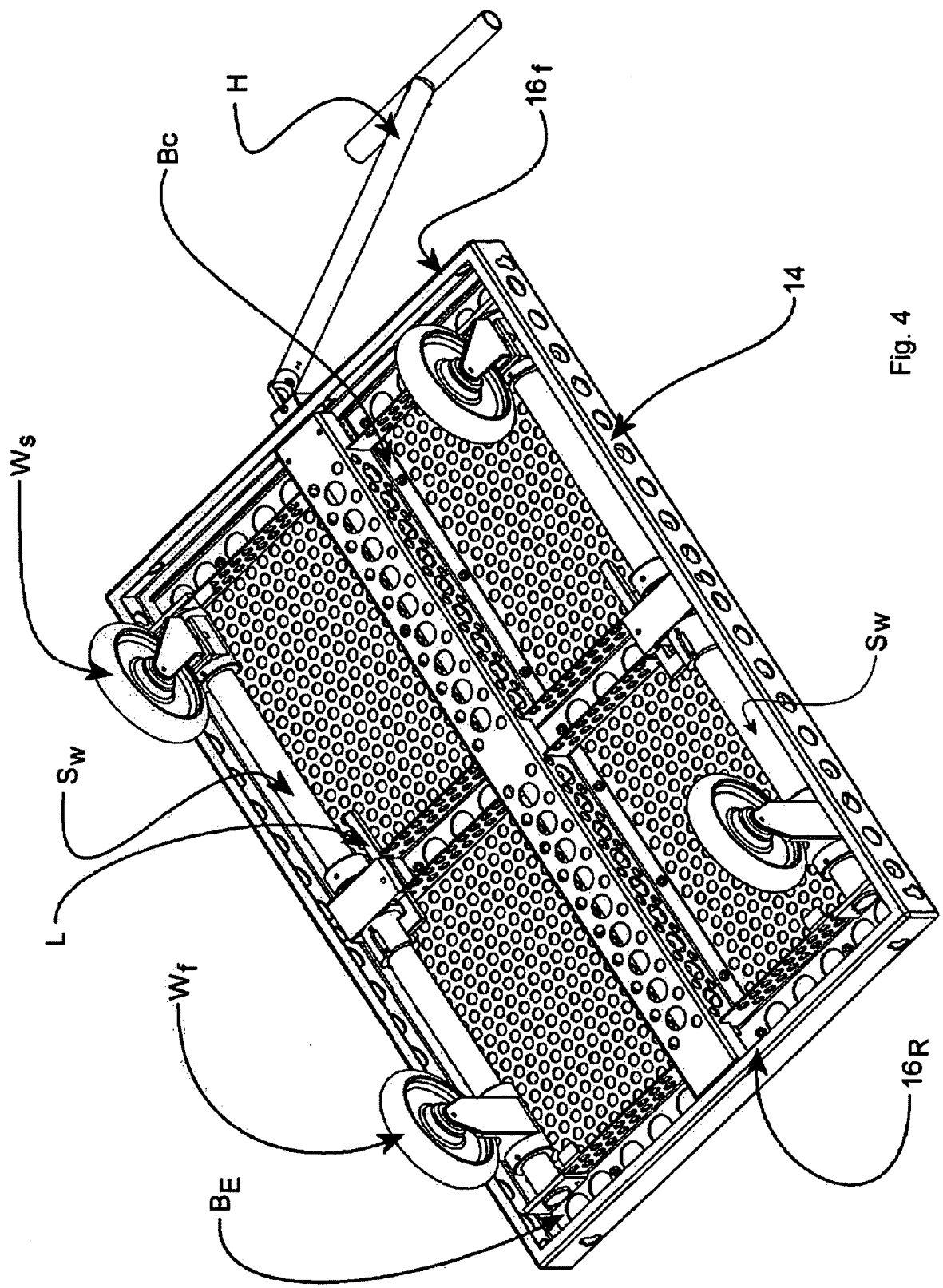
FIG. 4 is a perspective view of the cart in the operative position as viewed from the bottom.
Figures 5, 5A:
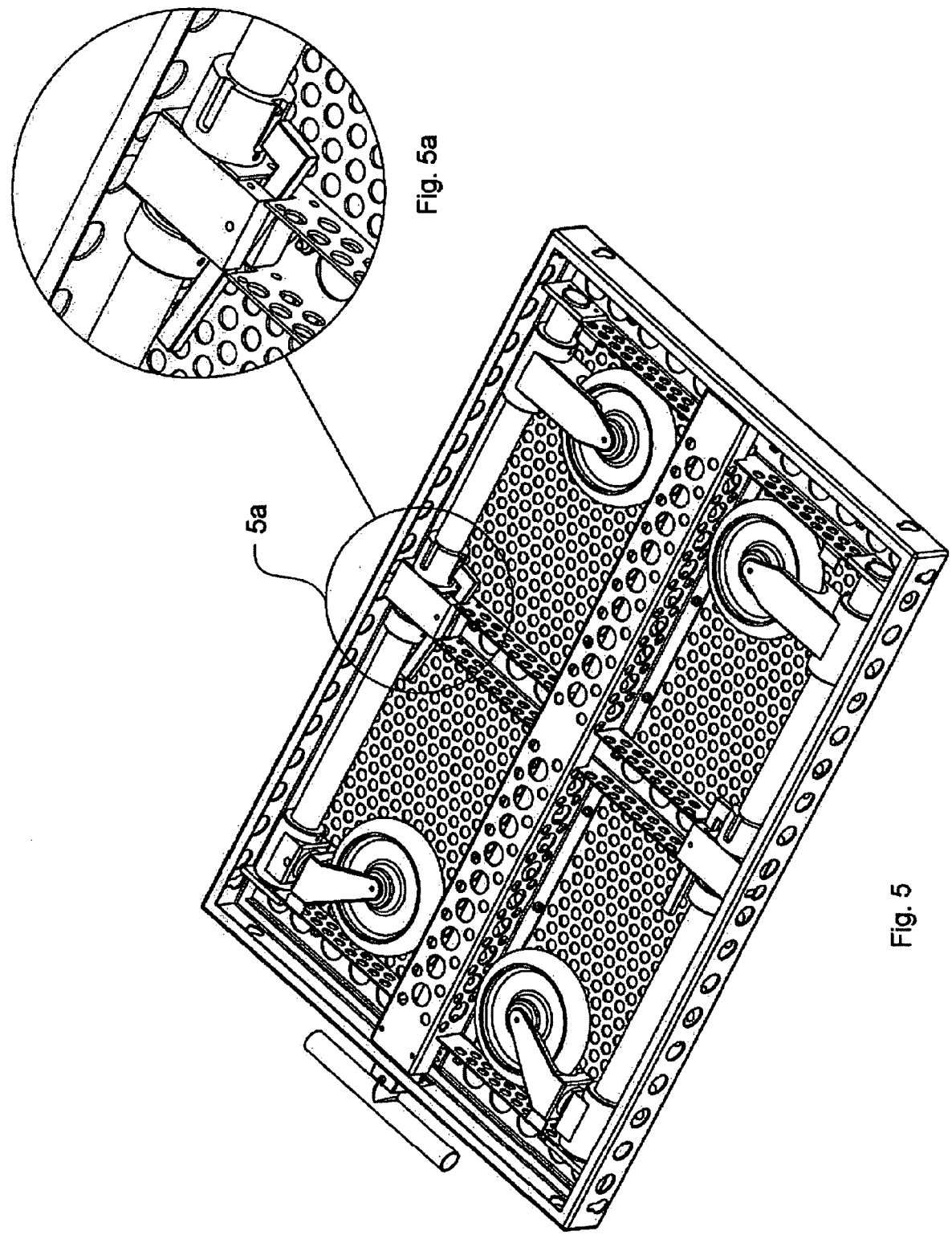
FIG. 5 is a perspective view of the cart in the storage position as viewed from the underside.
FIG. 5a is an enlarged fragmentary view of the portion circled in FIG. 5 labeled 5a showing the locking lever pivoted to a release mode to permit rotation of the wheel assembly between limit positions.
Figures 6, 6A:
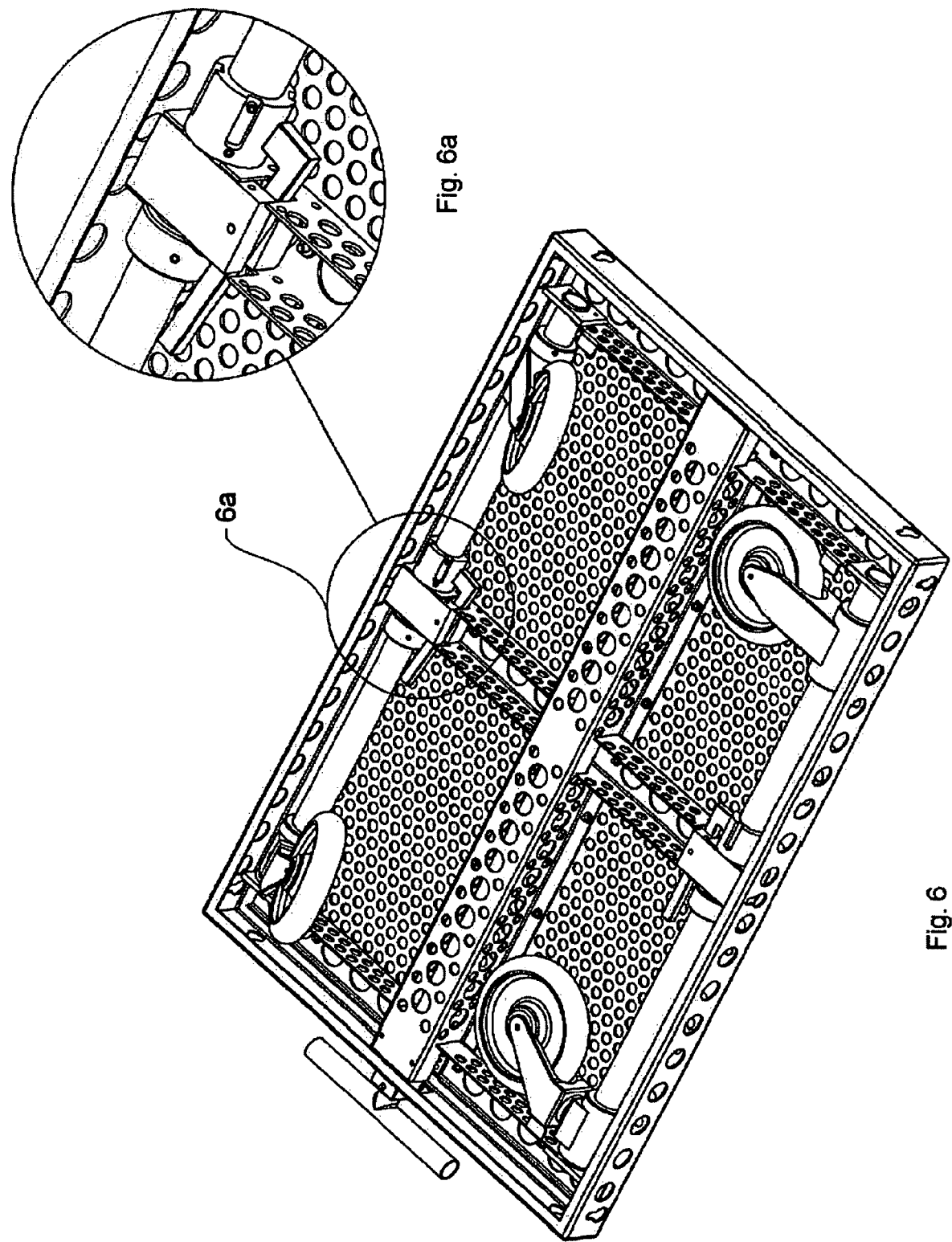
FIGS. 6 and 6a are views similar to FIGS. 5 and 5a respectively showing one of the wheel shafts rotated to a midway position.
Figure 11:
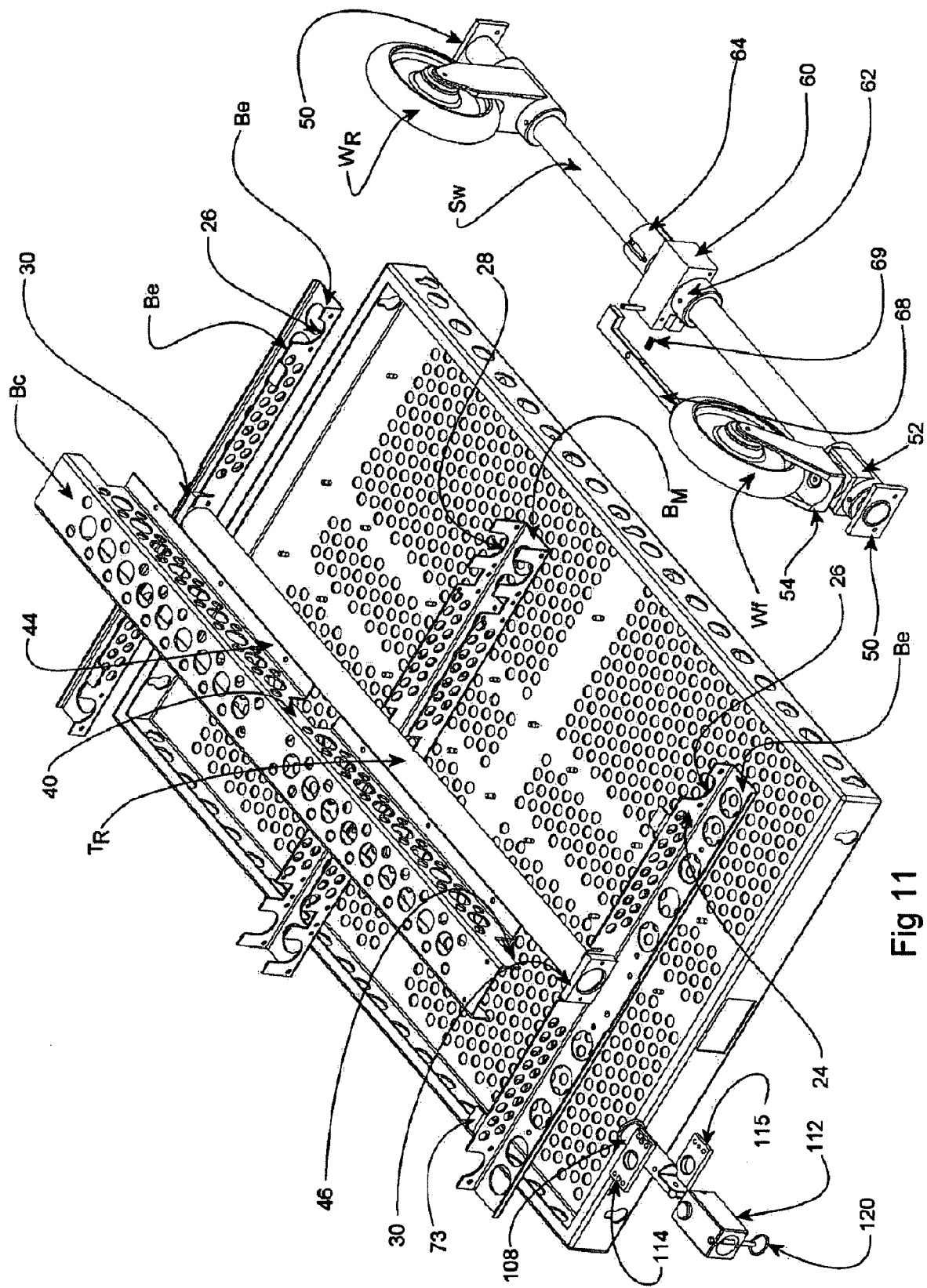
FIG. 11 is a exploded perspective view of the cart assembly.

The cart assembly C includes a pair of front wheels $W_f$ which swivel and a pair of fixed rear wheels Wr. The front and rear wheels as best illustrated in FIGS. 4 and 11 are mounted on shafts Sw actuatable between a retracted position nested in the support cover (see FIG. 3) and an operative position (see FIG. 4). Means including a manually operable wheel release and lock lever L facilitates positioning the wheels in the stored and operative positions.

A handle assembly H is positionable between an operative outer limit position (FIG. 1) providing a means to maneuver and guide the cart C and a storage position in a handle guide tube $T_h$ located interiorly of the cart center brace Bc with only the hand grip portion exposed providing a means for carrying the cart C.

Considering now more specifically elements of the cart described above, the cart support cover Cs comprises a generally rectangular top panel 12 having depending side walls 14,14, front and rear end walls 16f and 16r which in the present instance are formed integrally with the top panel 12. The top panel 12 and support braces B are preferably made of a thin gage aluminum so that components of the cart such as the support cover Cs and the various braces B can be made rather economically by a stamping operation. The top panel has holes H in a predetermined pattern leaving solid portions in the region of the braces to accommodate screw fasteners for fastening the braces in place to the underside of the top panel 12. The side walls 14 have a row of larger openings O to provide a means for latching a bungee cord to hold objects in place on the top panel of the cart. The side and end walls 14, 16 also have key hole slots 20 providing a means to detachably connect the side and end panels as shown in FIG. 8.

The bracing configuration to rigidify the top cover Cs to enhance the load carrying capacity of the cart C is best shown in the exploded perspective view of FIG. 11. As shown therein, there are two end braces Be, each of generally L-shaped cross section which are mounted adjacent the front end wall 16f and rear end wall 16r. The upstanding wall 24 of each end brace Be has a scalloped cut out 26 to cradle the wheel shaft Sw in the manner shown. The middle brace Bm is of U-shaped cross section and has scalloped cut outs 32 at its outer terminal ends to accommodate the wheel shafts Sw. The center brace Bc also has a cut out 28 and mounts a center guide tube support 30 to accommodate mounting the handle guide tube Th. The upstanding side walls of the middle brace Bm have cut away portions to accommodate mounting of the handle guide tube Th. The center brace Bc is of inverted U-shaped cross section having spaced parallel depending side faces 40, 40 with outwardly directed flanges 44 to facilitate securing the center brace Bc in place by screw fasteners. The outer terminal ends of the center brace Bc are cut back as at 46 so that the terminal ends nest in slots 48 on either side of the center guide tube support 30 and the center brace Bc overlies and encapsulates the handle guide tube Th.

The elongated tubular shafts S for the wheels Wf, Wr are rotatably journaled at their outer axial ends in trunnion pivot support members 50 mounted on the upstanding faces of the end brackets Be in the region of the scalloped cut outs 28. The front swivel wheels Ws are mounted adjacent the front end of the cart by a collar 52 held in a predetermined fixed position on the wheel shaft S and a swivel wheel holder 54 rotatably mounted on the collar. The fixed rear wheels Wr are mounted in a rigid caster mount 56 supported on the opposite end of the wheel shaft Sw in a predetermined position.

The system for controlling selective positioning of the wheel assemblies between an extended operative position and a retracted storage mode is best illustrated in FIGS. 8b. As shown therein the wheel shafts Sw are journaled in center support bearing 60 mounted in center brace Bc between a space collar 62 and a tubular pivot rod catch 64 having a series of circumferentially spaced locking slots 66 extending axially of the wheel shaft $S_w$ which have tapered side walls 67. A wheel release/lock lever 68 is pivotally mounted in an extended portion of the support bearing 60 by a spring 69 and is normally biased in a direction to pivot the tip 70 of the lever 68 to engage in the slots 64. The tip 70 of the lever 68 has tapered side faces 72 complementing the taper 67 of slots 66 to snugly engage the slot and provide a rigid, wobble-free support for the wheels in the operative and stored positions.

The details and arrangement of the retractable handle assembly $T_h$ are best illustrated in FIGS. 9a, 9b, 9c and 9d. The handle assembly comprises an elongated tubular shaft 100 of a hand grip P102, the shaft 100 is of a diameter less then the diameter of the guide tube for easy sliding movement when positioning the handle H between and an outer operative limit position (see FIGS. 1, 9b) and an inner stored position (See FIGS. 2, 2a and 9a). A handle pivot mount 104 seats in the open inner end of the handle shaft 100 which is pivotally connected at 106 with handle pivot attachment rod 108. The rod 108 engages in the bore 110 of handle pivot trunnion 112 which projects through an enlarged window 114 in the front end wall 14 of the top support $C_s$ for limited angular movement of pivot trunnion 112 and handle H to allow maneuvering of the cart by the user.

The outer end of the tubular portion 112a of the pivot trunnion 112 has aligned radial guide holes 118 for a locking pin 120 which can be inserted when the radial guide holes 118 are aligned with a radial through port in the pivot trunnion 112 as shown in FIG. 9a. The inner axial end of the handle pivot attachment rod 108 had a radially outwardly directed flange 108a which abuts the inner axial end face of the handle pivot trunnion 112 when the handle is withdrawn to its outer limit position. Note the outer diameter $D_3$ of the flange 108a is less than the diameter $D_4$ of the handle storage tube Th so that the handle can be easily retracted to a storage position.

The handle pivot attachment rod 108 has a radial orientation pin 120 which registers with a notch 122 in the pivot trunnion 112 to align the holes and through port in the pivot trunnion to allow insertion of the locking pin 120 to lock the handle in the outer limit position.

Figure 12:
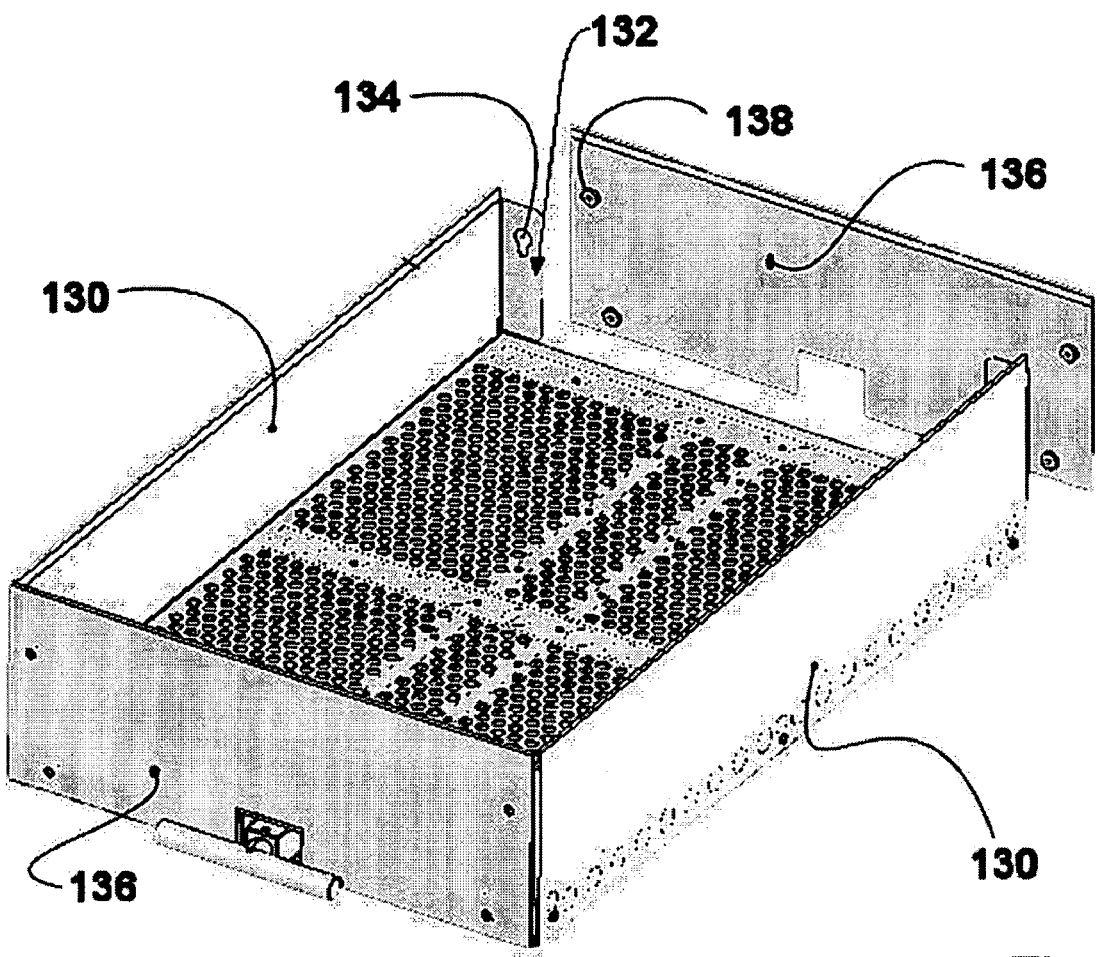
FIG. 12 is a fragmentary perspective view showing side and end panels which may be assembled rather easily and quickly to add side and end walls to the cart.
Figure 13:
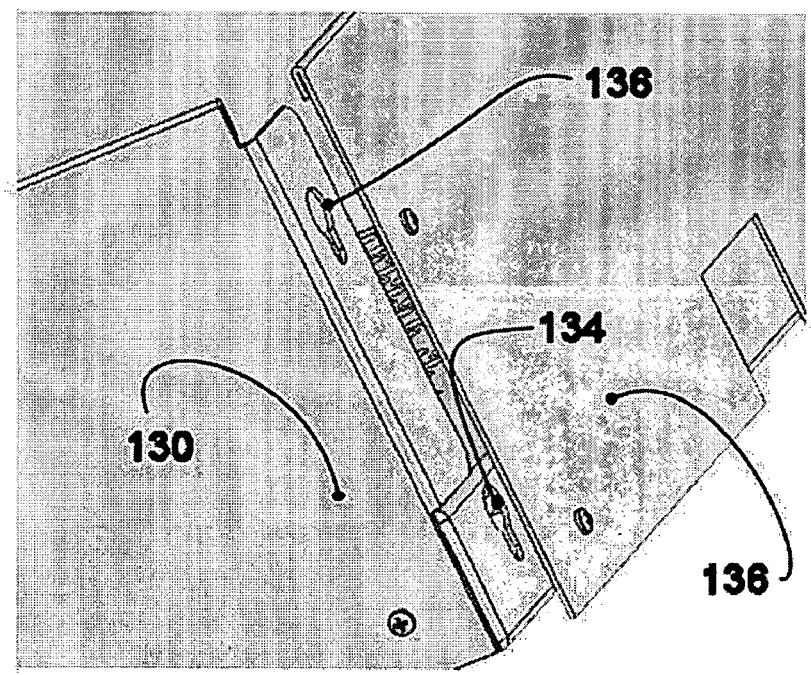

The cart may be provided with detachable walls which can be mounted to the periphery of the top cover C in the manner shown in FIGS. 12 and 13. In this instance the side panels 130 have inwardly directed flanges 132 at opposite ends and at least one key hole slot. The front and rear panels mount buttons 138 adjacent the outer side edges which are oriented to engage in the key hole slot 134 in the side panel 130 and the key hole slot S in the front and rear walls 16f and 16r of the side walls 14 of the top support cover Cs in the manner shown in FIGS. 13 and 14.

Even though a particular embodiment of the invention has been illustrated and described herein, it is not intended to limit the invention and changes and modifications may be made therein wither the scope of the attached claims. For example, the braces may be secured to the top cover by other means such as welding. Further in the embodiment illustrated the wheel assembly is independently actuatable between extended and retracted limit positions and can readily be linked together to provide simultaneous movement between limit positions. Even though the specific means for securing the handle in the extended and stored positions is an important feature of the present invention, other locking arrangements are possible.

What is claimed is:

1. A cart assembly comprising a housing and a wheel assembly mounted in the housing, said wheel assembly comprising a pair of elongated shafts rotatably supported in said housing and a swivel wheel mounted at one end of said shafts and a fixed wheel mounted at the opposite end of said shafts, releasable locking means for selectively positioning said wheel assembly between operative and stored limit positions, said releasable locking means comprising a bearing mounted in said housing circumscribing each of said shafts and a lever pivotally mounted on said bearing to normally bias the lever to engage in circumferentially spaced locking slots in a collar mounted on each of said shafts whereby the lever is biased to engage in one of the slots when the wheel assembly is in an extended limit position and engages in another of said slots when the wheel assembly is in a retracted storage limit position nested in the housing, a handle assembly and means for selectively positioning the handle between an outer operative limit position and an inner stored limit position inside the housing.

2. A cart assembly as claimed in claim 1 wherein the tip of said lever and said slots have complementary tapers to provide a rigid, wobble-free fit when the lever is engaged.

3. A cart assembly as claimed in claim 2 including spring biasing means normally pivoting said lever in a direction to engage in said slots when radially aligned therewith.

4. A cart assembly comprising a housing and a wheel assembly mounted in the housing, said wheel assembly comprising a pair of elongated shafts rotatably supported in said housing, a front wheel mounted at one end of said shafts and a rear wheel mounted at the opposite end of said shafts, releasable locking means for selectively positioning said wheel assemblies between operative and stored limit positions, said releasable locking means comprising an annular member mounted in said housing circumscribing each of said shafts and a lever pivotally mounted on said annular member to normally bias the lever to engage in circumferentially spaced locking slots in a collar mounted on said shaft whereby the lever is biased to engage in one of the slots when the wheel assembly is in an extended limit position and engages in another of said slots when the wheel assembly is in a retracted storage limit position nested in the housing, a handle assembly and means for selectively positioning the handle between an outer operative limit position and an inner stored limit position.

5. A cart assembly comprising a housing and a wheel assembly mounted in the housing, said wheel assembly comprising a pair of elongated shafts rotatably supported in said housing and a swivel wheel mounted at one end of said shafts and a fixed wheel mounted at the opposite end of said shafts, releasable locking means for selectively positioning said wheel assembly between operative and stored limit positions, said releasable locking means comprising a bearing mounted in said housing circumscribing said shafts and a lever pivotally mounted on said bearing to normally bias the lever to engage in circumferentially spaced locking slots in a collar mounted on said shaft whereby the lever is biased to engage in one of the slots when the wheel assembly is in an extended limit position and engages in another of said slots when the wheel assembly is in a retracted storage limit position nested in the housing.

6. A cart assembly comprising a housing and a wheel assembly mounted in the housing, said wheel assembly comprising a pair of elongated shafts rotatably supported in said housing and a front wheel mounted at one end of said shafts and a rear wheel mounted at the opposite end of said shafts, releasable locking means for selectively positioning said wheel assembly between operative and stored limit positions, said releasable locking means comprising a spring biased locking lever selectively engagable in circumferentially spaced locking slots associated with each of said shafts whereby the wheel assembly is in an extended operative position when the lever engages in one of said slots and in a retracted storage position nested in the housing when the locking lever engages in another of said locking slots, a handle assembly and means for selectively positioning the handle between an outer operative limit position and an inner stored limit position.

7. A cart assembly having a housing comprising a top cover including a generally rectangular top panel having a pattern of mesh holes, side and end walls depending from said top panel having openings to accommodate bungee hooks for securing items to the top panel, a series of cross braces and a longitudinally extending center brace of inverted U-shaped cross section defining a chamber for the handle in a stored position and a wheel assembly mounted in the housing, releasable locking means for selectively positioning said wheel assembly between operative and stored limit positions, a handle assembly and means for selectively positioning the handle between an outer operative position and an inner stored position in the storage chamber inside the housing, and a pivot trunnion mounted in said housing adjacent one open end of said handle storage chamber, a handle pivot attachment rod and handle pivot mount pivotally connected thereto mounted at the inner end of said shaft, said handle and pivot attachment rod slideable in said handle pivot trunnion to permit movement of said handle shaft into and out of said storage chamber.

8. A cart assembly as claimed in claim 7 where said handle pivot attachment rod has a radially outwardly directed flange which abuts the trunnion pivot support when the handle assembly is in its outer operative limit position whereby the locking pin can be engaged to lock the handle in said operative limit position.

\* \* \* \* \*